United States Patent [19]

Burnell

[11] 4,004,412
[45] Jan. 25, 1977

[54] GAS TURBINE ENGINE FUEL METERING SYSTEM

[75] Inventor: Dennis G. A. Burnell, Winsted, Conn.

[73] Assignee: Chandler Evans Inc., West Hartford, Conn.

[22] Filed: Dec. 20, 1974

[21] Appl. No.: 534,663

[52] U.S. Cl. .................... 60/39.28 R; 417/15; 417/17
[51] Int. Cl.² ............................................ F02C 9/06
[58] Field of Search ............ 60/39.28 R; 417/15, 417/17, 20, 22

[56] References Cited

UNITED STATES PATENTS

| | | | |
|---|---|---|---|
| 3,128,603 | 4/1964 | Haigh | 60/39.28 R |
| 3,240,013 | 3/1966 | Spath | 60/39.28 R |
| 3,478,512 | 11/1969 | Brahm | 60/39.28 R |
| 3,596,467 | 8/1971 | Avery | 60/39.28 R |
| 3,832,846 | 9/1974 | Leeson | 60/39.28 R |

*Primary Examiner*—Clarence R. Gordon
*Attorney, Agent, or Firm*—Radford W. Luther; Richard A. Dornon

[57] ABSTRACT

A fuel control system has a positive displacement gear pump for supplying a metered fuel flow to a gas turbine engine. A variable speed drive mechanism, as constituted by a hysteresis type of electro-magnetic clutch driven by the engine, is operatively connected to the pump for varying the speed of the pump in accordance with a commanded pump speed signal. A scheduling device, which senses various engine parameters, generates a signal indicative of a scheduled fuel flow. The fuel flow signal is, in turn, applied to a function generator which supplies the commanded pump speed signal in accordance with a predetermined relationship between pump speed and fuel flow for the engine sought to be controlled. The relationship between pump speed and fuel flow may be calculated for a wide range of flight conditions since the pressure rise or head across the pump is basically a function of fuel flow. This arrangement obviates the use of a head regulator for highly accurate fuel metering.

1 Claim, 4 Drawing Figures

GAS TURBINE ENGINE FUEL METERING SYSTEM

BACKGROUND OF THE INVENTION

This invention relates to fuel control systems for gas turbine engines, and more particularly to fuel control systems which embody a metering pump driven by a variable speed drive mechanism.

U.S. patent application Ser. No. 433,229, filed Jan. 14, 1974, now U.S. Pat. No. 3,908,360, and entitled "Pump Metering Fuel Control System" shows a fuel control system which incorporates a metering pump driven by a variable speed drive mechanism. The pressure rise across the pump is controlled by a head regulator so that the output flow thereof is essentially a linear function of pump speed, the back pressure variation not influencing fuel flow. When coupled with a closed loop speed control for the pump, such an arrangement permits open loop scheduling of acceleration and deceleration fuel flow to yield accurately metered flows.

SUMMARY OF THE INVENTION

The invention provides a fuel control system having a metering pump which allows for open loop scheduling of acceleration and deceleration fuel flows to yield highly accurate metered flows without the need for a head regulator to maintain a constant pressure head across the metering pump. Accurate control of engine fuel flow is made possible by control of pump speed because of the fact that the relationship between pump speed, pump back pressure, and fuel flow has been found to be predictable for differing flight conditions, that is, compressor inlet temperatures and pressures.

In accordance with the invention, a positive displacement fuel metering pump is driven by a variable speed drive mechanism having a closed loop speed control. A scheduling device senses various engine parameters and generates a first signal indicative of a requested fuel flow. A function generator, which has programmed therein the relationship between fuel flow and pump speed, receives the first signal and generates a second signal indicative of the pump speed which will produce the fuel flow requested by the first signal. The second signal is directed to the variable speed drive mechanism via a suitable summing means which also receives a third signal indicative of the actual speed of the pump.

Accordingly, it is a primary object of the invention to provide a fuel control system incorporating a metering pump which does not mandate the inclusion of a head regulator for highly accurate fuel metering based upon open loop fuel flow scheduling.

This and other objects and advantages of the invention will become more readily apparent from the following detailed description, when taken in conjunction with the accompanying drawings, in which:

DETAILED DESCRIPTION OF PREFERRED EMBODIMENT

Figure 1:
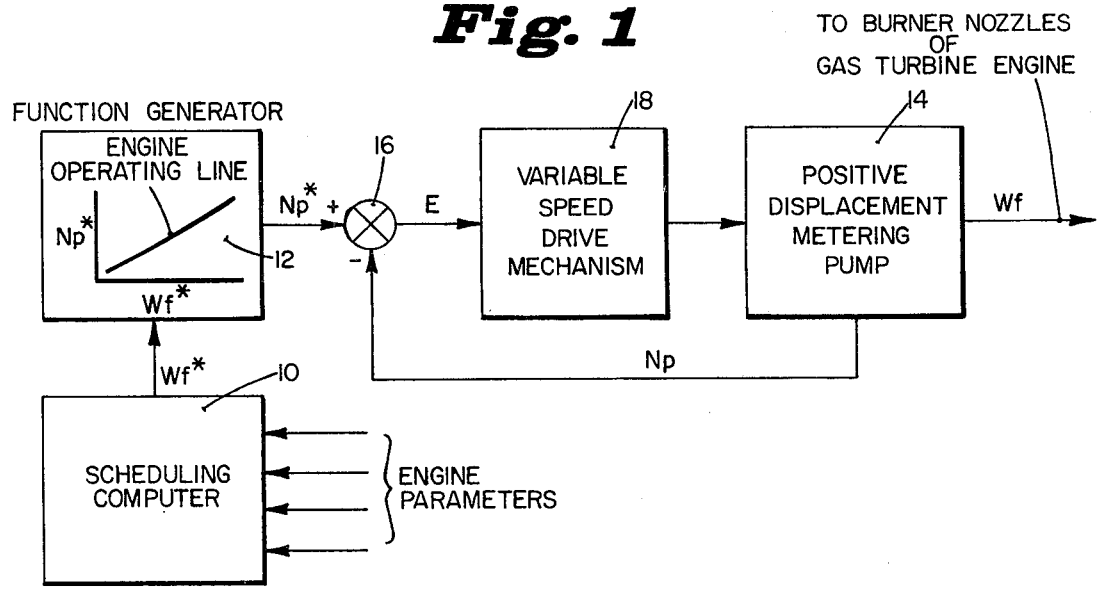
FIG. 1 is a functional block diagram of a form of fuel control system of the invention.

Referring to FIG. 1, wherein a form of the invention is depicted in block form, a computer 10 is provided for sensing a plurality of parameters of a gas turbine engine (not shown) and generating a signal $W_f^*$ representative of a scheduled fuel flow. The particular parameters sensed by the computer 10 and the detailed construction thereof form no part of the present invention since the type of computer selected admits of many choices dependent upon the engine sought to be controlled and the use to which the engine is applied. Briefly stated, the computer 10, which may be a mechanical, electrical or fluidic device, schedules volume fuel flow in response to actual engine operating conditions during acceleration and deceleration and also governs during steady state operation. The requested fuel flow signal $W_f^*$ is applied to a function generator 12 which has programmed therein the predetermined relationship between fuel flow and the speed of a fuel metering positive displacement pump 14, such as a gear or vane pump. The function generator 12 directs a commanded pump speed signal $N_p^*$ to a summer 16 which also receives a feedback signal $N_p$ indicative of the actual speed of the pump 14. The summer 16 furnishes an error signal E to an appropriate variable speed drive mechanism 18 (such as a DC motor, a mechanical transmission or a magnetic clutch) which, in turn, drives the pump 14 at the commanded speed. The metered fuel flow $W_f$ from the pump 14 proceeds thence to the burner nozzles of the gas turbine engine.

Accurate control of fuel flow by varying the pump speed is possible because of the fact that the relationship between fuel flow, pump speed, and pump back pressure is essentially predictable for different burner pressures and compressor inlet temperatures, as the following analysis will make evident. In general, the fuel flow delivered by a positive fixed displacement pump may be expressed by the following equation:

$$W_f = K_a N_p - K_b \Delta P \quad (1)$$

wherein:

$W_f$ is the fuel flow (lb/hr);

$K_a$ is the pump output per revolution (lb-min)/(hr-rev);

$N_p$ is the pump speed (rev/min);

$K_b$ is a constant reflecting the change in pump flow per psi; and $\Delta P$ is the pressure rise or head across the pump (discharge or back pressure $P_D$ minus inlet pressure $P_i$).

The pressure rise across the pump may be defined by the following equation:

$$\Delta P = P_D - P_i = P_B + \Delta P_{Noz.} - P_i \quad (2)$$

wherein:

$P_B$ is burner pressure; and $\Delta P_{Noz.}$ is the pressure across the nozzles which is equal to $P_D - P_B$.

$P_B$ may be expressed as follows during engine acceleration:

$$P_B = \frac{W_f}{K_c \sqrt{\theta}} \tag{3}$$

wherein:
$K_c$ is a constant of acceleration fuel flow; and
$\theta$ is the ambient temperature correction which is equal to the temperature in degrees Rankine divided by 520°R.

Fuel flow is related to the nozzle pressure drop as follows:

$$\Delta P_{Noz} = K_d W_f^2 \tag{4}$$

wherein:
$K_d$ is the total effective burner nozzle coefficient.

Substituting the expressions of equations 3 and 4 in equation 2, the pressure rise across the pump can be written as follows:

$$\Delta P = K_d W_f^2 + \frac{W_f}{K_c \sqrt{\theta}} - P_i \tag{5}$$

Substituting for $\Delta P$ in equation 1, the relationship between pump speed and acceleration fuel flow can be expressed in the following manner:

$$N_p = K_1 W_f^2 + K_2 W_f - K_3 P_i \tag{6}$$

wherein:
$K_1$ is a constant equal to $$\frac{K_b K_d}{K_a};$$

$K_2$ is a constant equal to $$\frac{1}{K_a} + \frac{K_b}{K_a K_c \sqrt{\theta}};$$

and
$K_3$ is a constant equal to $$\frac{K_b}{K_a}.$$

Since inlet pressure $P_i$ will normally be substantially unchanged, or of a negligible value, equation 6 may be rewritten as follows:

$$N_P = K_1 W_f^2 + K_2 W_f - K_4 \tag{7}$$

wherein:
$K_4$ is a constant equal to $K_3 P_i$.

For engine deceleration, $P_B$ may be expressed as follows:

$$P_B = \frac{W_f}{K_e \sqrt{\theta}} \tag{8}$$

wherein:
$K_e$ is a constant of deceleration fuel flow.
The pressure rise across the pump for deceleration is then:

$$\Delta P = K_d W_f^2 + \frac{W_f}{K_e \sqrt{\theta}} - P_i \tag{9}$$

and the relationship between pump speed and deceleration fuel flow, obtained by substituting for $\Delta P$ in equation 1, is as follows:

$$N_p = K_1 W_f^2 + K_5 W_f - K_4 \tag{10}$$

wherein:
$K_5$ is a constant equal to $$\frac{1}{K_a} + \frac{K_b}{K_a K_e \sqrt{\theta}}$$

As a practical matter, $K_5$ will be approximately equal to $K_2$ for the majority of engines. This is because $1/K_a$ will be much greater than either $K_b/K_a K_c \sqrt{\theta}$ or $K_b/K_a K_e \sqrt{\theta}$, irrespective of the variation between $K_c$ and $K_e$. For example, typical values of $K_c$ and $K_e$ are 1 and 2, respectively. Similarly, wide variations in the ambient temperature, which affect the term $\sqrt{\theta}$, have negligible effect on the values of $K_2$ and $K_5$.

For minimum error, the fuel flow equation is preferably written in the following manner:

$$N_p = K_1 W_f^2 + K_6 W_f - K_4 \tag{11}$$

wherein:
$\sqrt{\theta}$ is computed on the basis of a 60° F temperature; and
$K_6$ is equal to $$\frac{K_2 + K_5}{2}$$

The maximum error in acceleration or deceleration fuel flow, when pump speed is controlled in accordance with equation 11 at altitudes from 0 to 20,000 ft. and ambient temperatures from −65° F to 135° F, should be well under 2 percent. It should also be noted that fuel flow errors due to variations in the ambient temperatures could, if desired, easily be compensated for in the computer 10, the function generator 12, or the summer 16.

Figure 4:
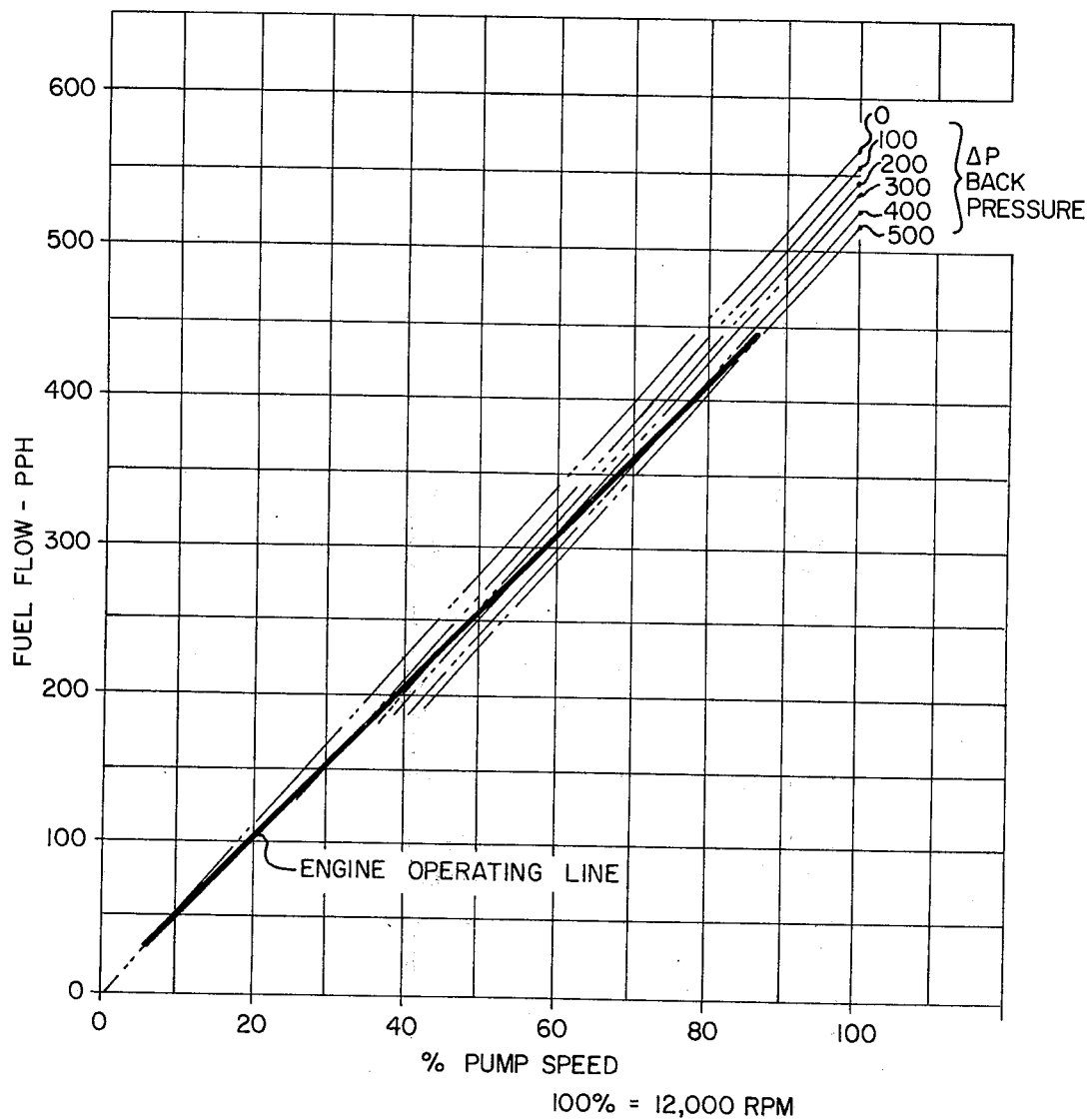
FIG. 4 is a graph showing the relationship between fuel flow and pump speed for a particular small gas turbine engine.

Equation 11 is now plotted on a pump map (FIG. 4) for a particular engine. As shown in the graph, equation 11 represents the engine operating line in which acceleration and deceleration fuel flow is essentially a function pump speed only for various altitudes and ambient temperature conditions. It is important to note that the line of FIG. 4 is not to be confused with traditional graphs of fuel flow vs engine speed since the operating line concerns pump speed. The engine operating line is then programmed into the function generator 12, whereby an input signal $W_f^*$ of requested fuel flow yields an output signal $N_p^*$ of commanded pump speed in accordance with the programmed relationship.

Figure 2:
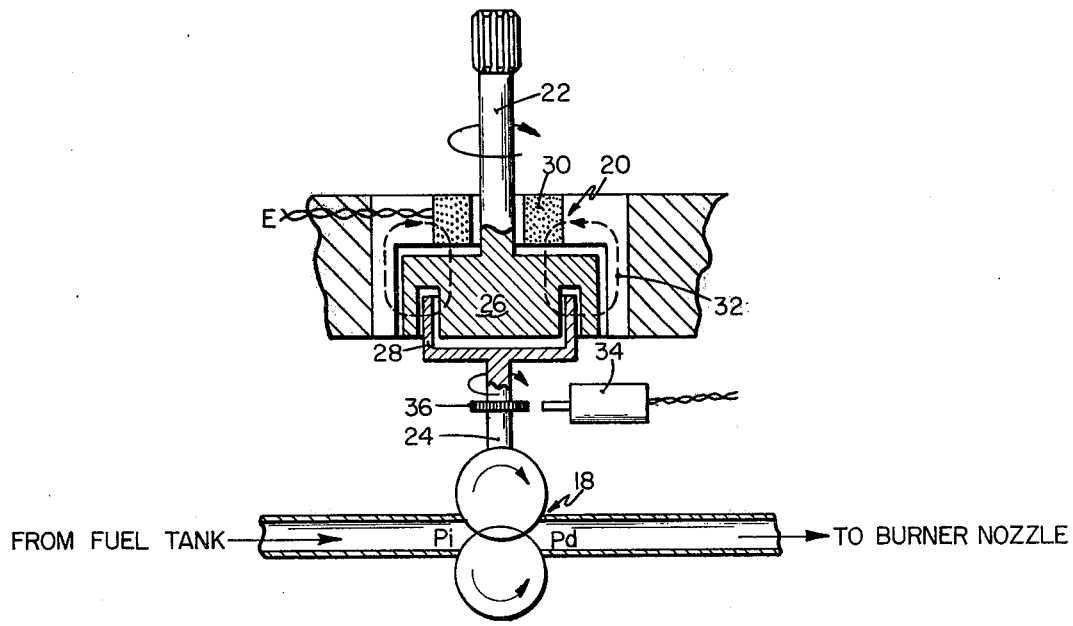
FIG. 2 is a fragmentary schematic view of a preferred embodiment of the system of FIG. 1.

Turning now to FIG. 2, a fragmentary schematic diagram of a preferred embodiment of the invention is set forth. A gear pump 18 is driven by an electro-magnetic clutch 20 which, in turn, is driven by a gas turbine engine (not shown) by means of a splined shaft 22. The illustrated clutch is of the hysteresis type with no parts in sliding contact and its construction and operation is well known to those skilled in the art. The hysteresis clutch 20 furnishes a purely magnetic coupling between the shaft 22 and a pump drive shaft 24 via a rotor 26 connected to the shaft 22 and a cup 28 connected to shaft 24. The clutch 20 is essentially a device for transmitting a torque which varies linearly over a wide range with an input clutch current through a coil 30, the coil 30 establishing a flux path 32. The actual speed $N_p$ of the pump is sensed by a magnetic speed pick-up 34 mounted adjacent a toothed wheel 36. The signal E, applied to the coil 30, is, of course, a current. The pump 18 receives fuel from a tank at a pressure $P_t$ and delivers it to the burner nozzles at pressure $P_D$.

Figure 3:
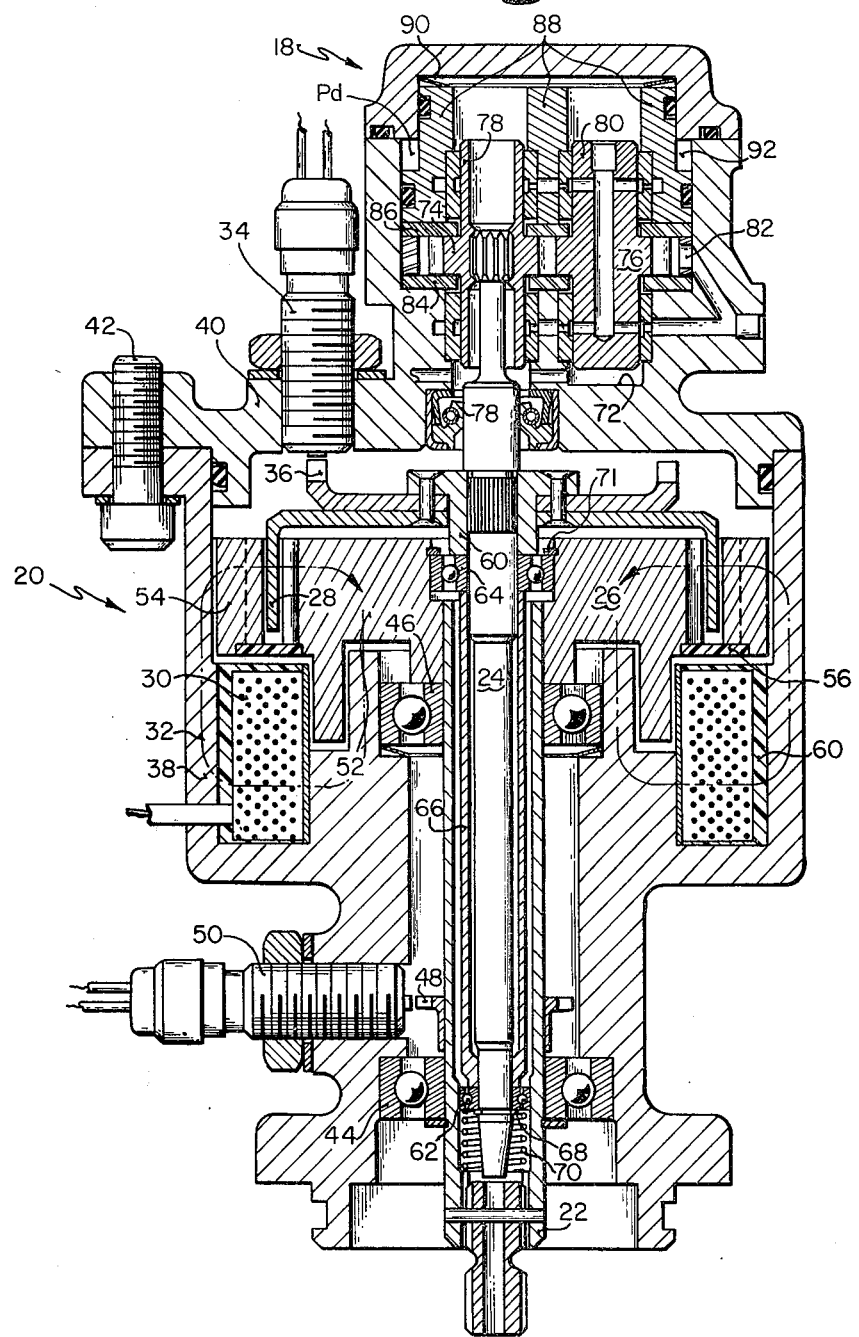
FIG. 3 is a longitudinal sectional view of a preferred construction for the embodiment of FIG. 2.

Referring to FIG. 3, there is shown a preferred construction for the embodiment of FIG. 2. A housing for the pump 18 and the clutch 20 comprises main sections 38 and 40 secured together by bolts 42. The shaft 22, which is non-magnetic, is supported for rotation within the housing 20 by bearings 44 and 46. A toothed wheel 48 is fixedly mounted in coaxial fashion upon the shaft adjacent a magnetic speed pick-up 50 which is in threaded engagement with the housing. The speed signal from the speed pick-up 50 is utilized by the computer 10 as an indication of engine speed. The shaft 22 is bonded to the rotor 26 which is made of iron and comprises an inner section 52 and an outer section 54 having the usual respective scalloped outer and inner peripheries in spaced confronting relationship. The sections 52 and 54 are structurally interconnected by an annular piece of nonmagnetic material 56.

Located adjacent the rotor 26 is the coil 30, secured to the housing 38 by a suitable potting compound 60, the coil receiving an input current proportional by pump speed error. Magnetic flux is then adapted to pass from the coil 30 through the housing 38 and thence to the rotor 26. The cup 28, which is received within the annular clearance between the sections 52 and 54, has a torque applied thereto by magnetic interaction with the rotor which revolves with the shaft 22. Both the cup 28 and the toothed wheel 36 are secured to an internally splined sleeve 60 mounted upon a splined surface of the shaft 24, the shaft 24 being coaxially arranged within the hollow interior of the shaft 22. The shaft 24 is carried for rotation by bearings 62 and 64. The bearing 62 is confined between a sleeve 66 and a retainer ring 68, while the bearing 64 is confined between the other end of sleeve 66 and the sleeve 60. A compression spring 70 urges the bearing 64 against the retaining ring 71.

Housing section 40 includes a pumping cavity 72. Mounted within the pumping cavity 72 are gears 74 and 76 which are arranged for intermeshing rotation about parallel axes. Shaft 24, which is surrounded by a shaft seal 78 at the entrance to cavity 72, is in splined engagement with the gear 74 for imparting rotation thereto. The gears 74 and 76 respectively include journals 78 and 80 which are mounted within bearings lubricated and cooled by fuel impelled by the dynamic pressure (recovered in port 82) of the swirling fuel in the inlet section of the pump. Side plates 84 and 86 are urged against the lateral faces of the gears 74 and 76 by a piston 88 biased by spring washer 90 and the pressure ($P_D$) in the annular volume 92. The pump also includes discharge sealing means (not shown). Although the specific construction of the pump, per se, forms no part of the present invention, reference should be had to U.S. patent application Ser. No. 529,693, filed on Dec. 5, 1974, now abandoned, in the name of Richard S. Hearn and entitled "Gear Pump Bearing Lubrication System" for a more detailed discussion thereof. This type of pump is advantageous in a system of the invention because the lubricating flow does not diminish the output flow to the engine.

With regard to the function generator 12, it is important to note that it need not generate a true parabolic function where the engine operating line approximates a straight line. This may be the case where the back pressure variation is small. Of course, for large variations in back pressure, the operating line will exhibit a large deviation from a straight line, thereby mandating non-linear programming of the function generator 12 instead of simple linear programming.

OPERATION

In operation, the computer 10 sense selected engine parameters, including engine speed, in accordance with the signal generated by the magnetic speed pick-up 50. The computer 10 directs a calculated requested fuel flow signal $W_f^*$ to the function generator 12 which generates a pump speed signal $N_p^*$ indicative of the proper pump speed to yield the scheduled fuel flow, taking into consideration the effect of pressure head variation on the pump output. The summer 16 receives the commanded pump speed signal $N_p^*$ and subtracts therefrom the actual pump speed signal $N_p$ from speed pick-up 34, thereby to generate the error signal E in the form of a current to the clutch coil 30. The engine driven shaft 22, and the rotor 26 rotate in unison at a speed corresponding to that of the engine while the cup 28 and the shaft 24 rotate at a speed less than that of shaft 22 by an amount determined by the current applied to the coil 30. The splined extremity of the shaft 24 rotates the gear 74 which, of course, also rotates the gear 76, thereby to pump a metered flow to the burner nozzles.

The graph of FIG. 4, which depicts the relationship between pump speed and fuel flow for a particular small gas turbine engine and gear pump, shows that large fuel metering errors would result in scheduled fuel flows if the effect of pressure head variation on the pump output were disregarded. It should be noted that for the pump in question, which incorporates side sealing means and discharge sealing means, a 100 psi variation in back pressure would cause a 10 pph drop in fuel flow for a given pump speed. Also, it is important to mention that while the operating line of FIG. 4 appears flat, it is in reality a curved line according to equation 11, as set forth heretofore.

Obviously, many modifications and variations are possible in light of the above teachings, without departing from the scope and spirit of the invention as defined in the appended claims.

I claim:

1. A fuel control system for a gas turbine engine having burner nozzles comprising:
   a scheduling computer to sense selected engine parameters and calculate a scheduled fuel flow, the scheduling computer being adapted to generate a requested fuel flow signal;
   a positive displacement metering pump for pumping a metered flow of fuel to the burner nozzles such that both fuel flow and the pressure head across the pump increase with the speed of the metering pump;

a variable speed drive mechanism drivingly connected to the metering pump to run the metering pump at the commanded speed;

a speed sensing device operatively connected to the metering pump for generating a feedback signal indicative of the actual speed of the metering pump;

means responsive to the scheduled fuel flow to generate a commanded pump speed signal which compensates for the affect on fuel flow of the variation in pressure head with pump speed such that the commanded pump speed signal requests a pump speed which delivers the scheduled fuel flow to the burner nozzles, the scheduled fuel flow responsive means comprising: a function generator for receiving the requested fuel flow signal and generating the commanded pump speed signal in approximate accordance with the following equation:

$$N_p = K\, W_f^2 + K'\, W_f - K''$$

wherein:
$N_p$ is pump speed;
$W_f$ is fuel flow;
$K$, $K'$, and $K''$ are constants; and means to sum the commanded pump speed signal and the feedback signal for directing an error signal to the variable speed drive mechanism.

* * * * *